(12) United States Patent
Turco et al.

(10) Patent No.: US 12,115,666 B2
(45) Date of Patent: Oct. 15, 2024

(54) METHODS, APPARATUSES, AND SYSTEMS FOR DYNAMICALLY RETRIEVING OBJECTS

(71) Applicant: Intelligrated Headquarters, LLC, Mason, OH (US)

(72) Inventors: Anthony Turco, Charlotte, NC (US); Adam Stutz, Charlotte, NC (US); Jacob D. Wieneke, Charlotte, NC (US)

(73) Assignee: Intelligrated Headquarters, LLC, Mason, OH (US)

( * ) Notice: Subject to any disclaimer, the term of this patent is extended or adjusted under 35 U.S.C. 154(b) by 188 days.

(21) Appl. No.: 17/305,211

(22) Filed: Jul. 1, 2021

(65) Prior Publication Data
US 2023/0001573 A1 Jan. 5, 2023

(51) Int. Cl.
| | |
|---|---|
| *B25J 13/08* | (2006.01) |
| *B25J 9/16* | (2006.01) |
| *B65G 1/04* | (2006.01) |
| *B65G 1/06* | (2006.01) |
| *B65G 1/137* | (2006.01) |

(52) U.S. Cl.
CPC ............. *B25J 9/162* (2013.01); *B25J 9/1697* (2013.01); *B25J 13/086* (2013.01); *B25J 13/089* (2013.01)

(58) Field of Classification Search
CPC ........ B25J 9/162; B25J 9/1697; B25J 13/086; B25J 13/089; B65G 1/0435; B65G 1/065; B65G 1/1371; B65G 1/0492
See application file for complete search history.

(56) References Cited

U.S. PATENT DOCUMENTS

| | | | | |
|---|---|---|---|---|
| 9,802,317 B1* | 10/2017 | Watts | ................... | G05B 19/402 |
| 10,766,700 B2* | 9/2020 | Engel | ....................... | B65G 1/10 |
| 11,230,435 B1* | 1/2022 | Mehta | ...................... | B65G 1/10 |
| 2003/0185656 A1* | 10/2003 | Hansl | .................. | B65G 1/0435 |
| | | | | 414/277 |
| 2015/0217935 A1 | 8/2015 | Nakamura | | |

(Continued)

FOREIGN PATENT DOCUMENTS

| | | |
|---|---|---|
| AT | 14863 U1 | 7/2016 |
| WO | 2011/158422 A1 | 12/2011 |
| WO | 2015/038999 A2 | 3/2015 |

OTHER PUBLICATIONS

European search report Mailed on Dec. 5, 2022 for EP Application No. 22179549.

*Primary Examiner* — Adam R Mott
*Assistant Examiner* — Heather J Keniry
(74) *Attorney, Agent, or Firm* — Alston & Bird LLP

(57) ABSTRACT

Apparatuses, methods and systems for dynamically retrieving objects are disclosed herein. In one example, a retrieval apparatus is provided. The example retrieval apparatus comprises: at least one moveable arm mechanism configured to engage a surface of at least one of a plurality of objects; at least one sensing element configured to obtain sensor data describing locations and characteristics of the plurality of objects as the retrieval apparatus traverses an environment associated with the plurality of objects; and a controller component in electronic communication with the at least one arm mechanism and the at least one sensing element, wherein the controller component is configured to modify operational data based at least in part on the sensor data.

18 Claims, 9 Drawing Sheets

(56) References Cited

U.S. PATENT DOCUMENTS

| | | | |
|---|---|---|---|
| 2018/0005173 A1* | 1/2018 | Elazary | B25J 13/085 |
| 2020/0242544 A1* | 7/2020 | Galluzzo | B25J 9/1666 |
| 2021/0047116 A1* | 2/2021 | Stevens | B65G 1/1373 |
| 2021/0053216 A1* | 2/2021 | Diankov | B25J 19/023 |
| 2021/0094187 A1* | 4/2021 | Kanemoto | G06V 20/10 |
| 2021/0114826 A1* | 4/2021 | Simon | B25J 9/1697 |
| 2021/0122046 A1* | 4/2021 | Sun | B25J 9/1671 |
| 2021/0122589 A1* | 4/2021 | Griggs | B65G 67/08 |

* cited by examiner

METHODS, APPARATUSES, AND SYSTEMS FOR DYNAMICALLY RETRIEVING OBJECTS

BACKGROUND

Retrieval apparatuses may be utilized to perform retrieval operations with respect to various objects within an environment (e.g., material handling enterprise (MHE), warehouses, and/or the like). Many retrieval apparatuses are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for dynamically retrieving objects.

In accordance with various examples of the present disclosure, a retrieval apparatus is provided. The retrieval apparatus may comprise: at least one moveable arm mechanism configured to engage a surface of at least one of a plurality of objects; at least one sensing element configured to obtain sensor data describing locations and characteristics of at least some of the plurality of objects as the retrieval apparatus traverses an environment associated with the plurality of objects; and a controller component in electronic communication with the at least one moveable arm mechanism and the at least one sensing element, wherein the controller component is configured to modify operational data based at least in part on the sensor data.

In accordance with various examples of the present disclosure, a method for dynamically retrieving objects by a retrieval apparatus is provided. The retrieval apparatus may comprise at least one moveable arm mechanism, at least one sensing element and a controller component. The method may comprise: obtaining, by the at least one sensing element, sensor data associated with at least some of a plurality of objects as the retrieval apparatus traverses an environment associated with the plurality of objects; and modifying, by the controller component, operational data based at least in part on the sensor data; and in response to receiving a retrieval request, causing, by the controller component, the at least one moveable arm mechanism to engage a surface of the at least one of the plurality of objects based at least in part on the modified operational data.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
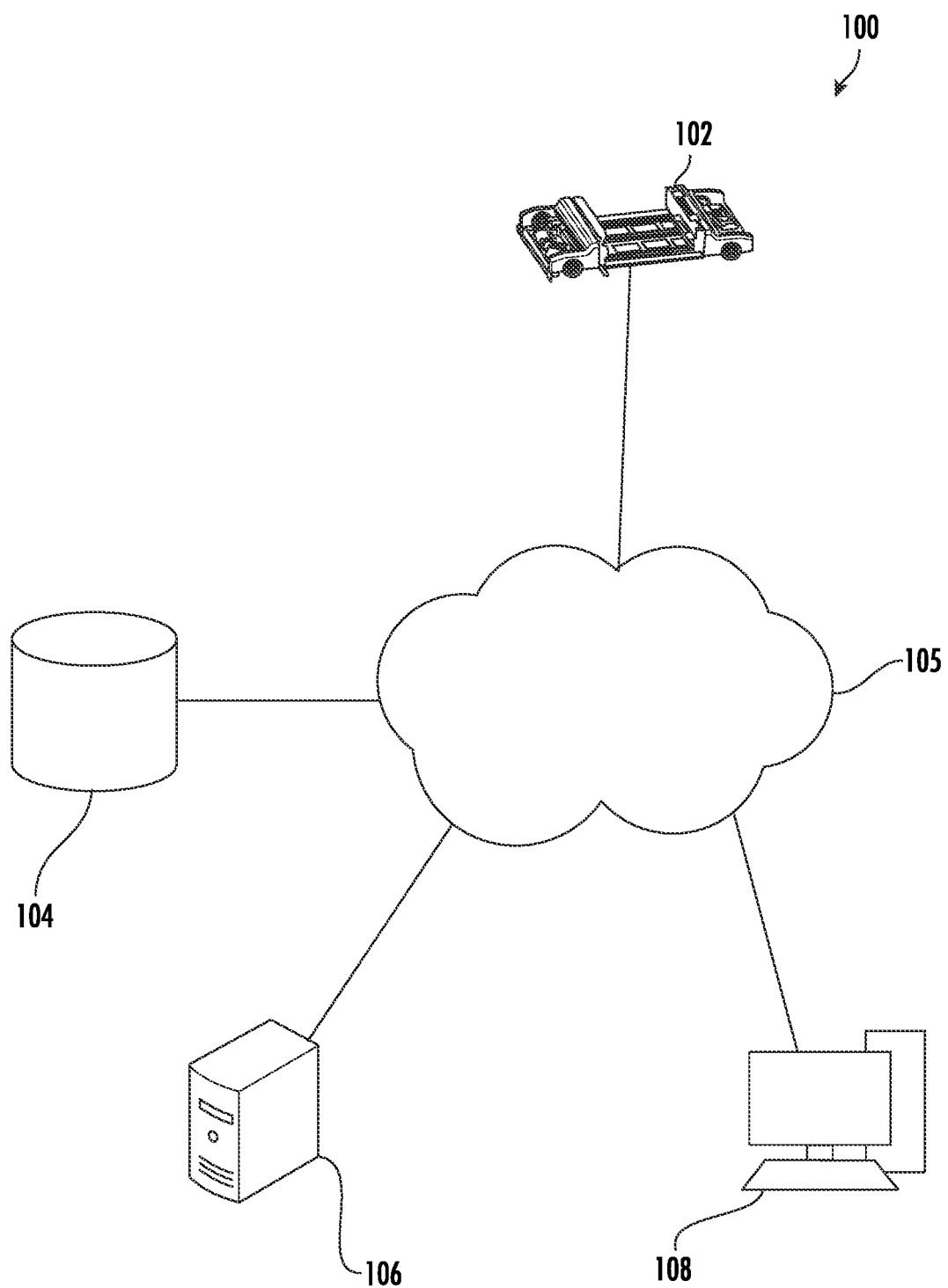
FIG. 1 illustrates an example of a system in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure may refer to two or more electrical elements (for example, but not limited to, an example processing circuitry, communication element, input/output module memory) and/or electric circuit(s) being connected through wired means (for example but not limited to, conductive wires, system bus, wired Ethernet connection or traces) and/or wireless means (for example but not limited to, wireless network, electromagnetic field, WI-FI®, BLUETOOTH®, ZIGBEE®), such that data and/or information (for example, electronic indications, signals) may be transmitted to and/or received from the electrical elements and/or electric circuit(s) that are electronically coupled.

The term "automated sorting and retrieval system (ASRS)" may refer to an object conveying system that operates to move objects of various sizes from one place to another within an environment. ASRS systems may be utilized in a variety of material handling applications including storage facilities, manufacturing plants, order fulfilment centers and the like. Such systems may comprise conveyors (e.g., planar conveyor belts, powered or unpowered rollers, and/or the like) to move objects from one place to another and may employ various mechanisms for retrieving and transporting objects such as a retrieval apparatus comprising one or more arm mechanisms. An example arm mechanism may extend or retract from one or more surfaces of a retrieval apparatus and may comprise one or more elements configured to engage a surface of an object in order to move the object (e.g., laterally or perpendicular to a travel direction along an example conveyor) during operations.

In various examples, retrieval apparatuses (e.g., shuttles, robots, motorized vehicles, combinations thereof, and/or the like) may be used to convey objects from one location to another within a system. In such examples, the retrieval apparatuses may rely on operational data/information provided by another computing entity in electronic communication therewith in order to navigate its environment. For example, the retrieval apparatus may receive a control indication to cause the retrieval apparatus (e.g., via one or more arm mechanisms) to perform retrieval operations (e.g., based on stored operational data describing locations of objects and the like). Additionally, in response to receiving the control indication, the retrieval apparatus may request and/or receive operational data describing locations of objects and system mapping/routing information. As such, the example retrieval apparatus may rely on data/information provided by another computing entity to facilitate retrieval operations. Thus, the example retrieval apparatus may be incapable of autonomously generating or updating operational data (e.g., object information and/or location/mapping information, including data indicative of object characteristics (e.g., length, width, height, cross-sectional area, shape, weight and/or the like).

In some examples, an object may be positioned in a location that is different from that which is indicated in stored operational data or operational data provided by a computing entity (e.g., in conjunction with a retrieval request) such that the retrieval apparatus is unable to fulfil retrieval requests. In another example, the object characteristics and dimensions may be inaccurate. In such examples, attempts by the example retrieval apparatus to retrieve or pick the object may damage system components or result in a faulted state which may halt further operations until, for example, an object is manually repositioned or a retrieval apparatus can be repaired. Such faulted states may result in reduced throughput and operational inefficiencies.

In accordance with various embodiments of the present disclosure, example methods, apparatuses, computer program products and systems are provided.

For example, the present disclosure may provide a retrieval apparatus comprising at least one moveable arm mechanism configured to engage a surface of at least one of the plurality of objects, at least one sensing element configured to obtain sensor data describing locations and characteristics of at least some of the plurality of objects as the retrieval apparatus traverses an environment associated with the plurality of objects. The example retrieval apparatus may comprise a controller component in electronic communication with the at least one moveable arm mechanism and the at least one sensing element, wherein the controller component is configured to modify operational data based at least in part on the sensor data. In some examples, the controller component is configured to, in response to receiving a retrieval request, cause the at least one moveable arm mechanism to engage a surface of at least one of the plurality of objects based at least in part on the modified operational data. In some examples, the retrieval apparatus comprises a receiving frame, and the at least one moveable arm mechanism may be configured to retrieve at least one of the plurality of objects and place it on the receiving frame. In some examples, the sensor data describes at least a first gap between at least two of the plurality of objects in a first direction, and at least a second gap between the at least two of the plurality of objects in a second direction that is parallel to the first direction. In some examples, the at least one sensing element comprises one or more light detection and ranging (LiDAR) sensors, radio detection and ranging (RADAR) sensors, infrared (IR) cameras, 3D cameras, 360° cameras, photoelectric sensors or proximity sensors. In some examples, the at least one sensing element is attached to at least a surface of the at least one moveable arm mechanism. In some examples, the at least one sensing element comprises at least one location sensor. In some examples, the retrieval request comprises the operational data, and wherein the retrieval request is provided by a computing entity in electronic communication with the retrieval apparatus. In some examples, the operational data comprises object location information and object characteristics associated with the plurality of objects. In some examples, the controller component is further configured to determine whether the operational data is sufficient for facilitating retrieval operations, and transmit an indication requesting additional operational data in an instance in which the operational data is deemed insufficient for facilitating the retrieval operations. In some examples, the controller component is configured to transmit at least a portion of the sensor data to a computing entity.

In another example, a method for dynamically retrieving objects by a retrieval apparatus is provided. The retrieval apparatus may comprise at least one moveable arm mechanism, at least one sensing element and a controller component. The example method may comprise obtaining, by the at least one sensing element, sensor data associated with at least some of a plurality of objects as the retrieval apparatus traverses an environment associated with the plurality of objects. In some examples, the method may comprise modifying, by the controller component, operational data based at least in part on the sensor data. In some examples, the method may comprise, in response to receiving a retrieval request, causing, by the controller component, the at least one moveable arm mechanism to engage a surface of the at least one of the plurality of objects based at least in part on the modified operational data. In some examples, the sensor data describes at least a first gap between at least two of the plurality of objects in a first direction, and at least a second gap between the at least two of the plurality of objects in a second direction that is parallel to the first direction. In some examples, the at least one sensing element comprises one or more light detection and ranging (LiDAR) sensors, radio detection and ranging (RADAR) sensors, infrared (IR) cameras, 3D cameras, 360° cameras, photoelectric sensors or proximity sensors. In some examples, the at least one sensing element is attached to at least a surface of the at least one moveable arm mechanism. In some examples, the at least one sensing element comprises at least one location sensor. In some examples, the retrieval request comprises the operational data, and wherein the retrieval request is provided by a computing entity in electronic communication with the retrieval apparatus. In some examples, the operational data comprises object location information and object characteristics associated with the plurality of objects. In some examples, the method may further comprise determining, by the controller component, whether the operational data is sufficient for facilitating retrieval operations. The method may further comprise transmitting, by the controller component, an indication requesting additional operational data in an instance in which the operational data is deemed insufficient for facilitating the retrieval operations. In some examples, the method may comprise transmitting, by the controller component, at least a portion of the sensor data to a computing entity.

As such, the present disclosure provides a retrieval apparatus for dynamically and autonomously retrieving objects (e.g., articles, items and the like) within an environment, thereby increasing operational throughput in a variety of applications.

Referring now to FIG. 1, an example schematic diagram depicting an example system 100 in accordance various embodiments of the present disclosure is provided. As depicted, the example system 100 comprises a retrieval apparatus 102, one or more computing entities 106 (e.g., servers), one or more databases 104, one or more networks 105, one or more user computing entities 108, and/or the like. In various examples, the system 100 may operate to convey objects within a particular location or environment.

In various embodiments, the retrieval apparatus 102 may be or comprise a robot, shuttle, motorized vehicle, combinations thereof, and/or the like. The example retrieval apparatus 102 may operate to transport objects within a particular location or environment based at least in part on real-time information obtained by one or more sensing elements of the retrieval apparatus. In some embodiments, the retrieval apparatus 102, the one or more computing entities 106, the one or more databases 104 and/or the one or more user computing entities 108 are in electronic communication with each other over the one or more networks 105 such that they can exchange data (e.g., receive and transmit data) with one another (e.g., periodically and/or in response to requests). Each of the components of the system 100, including the retrieval apparatus 102, the one or more computing entities 106, the one or more databases 104 and/or the one or more user computing entities 108 may be in communication with one another over the same or different wireless or wired networks 105 including, for example, a wired or wireless Personal Area Network (PAN), Local Area Network (LAN), Metropolitan Area Network (MAN), Wide Area Network (WAN), cellular network, and/or the like. While FIG. 1 illustrates certain system components as separate, stand-alone devices, the various embodiments are not limited to this particular architecture.

As depicted in FIG. 1, the example system 100 comprises one or more computing entities 106. In general, the terms computing device, entity, device, system, and/or similar words used herein interchangeably may refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes may include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 106 may also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like may be used to control certain aspects of the operation of the computing entity 106 with the assistance of the processing element and the operating system.

As indicated, in one embodiment, the computing entity 106 may also include one or more network and/or communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 106 may be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 1x(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WI-FI®), WI-FI® Direct, 802.16 (WiMAX), ultra-wideband (UWB), IR protocols, NFC protocols, RFID protocols, IR protocols, ZIGBEE® protocols, Z-WAVE® protocols, 6LoWPAN protocols, WIBREE®, BLUETOOTH® protocols, wireless universal serial bus (USB) protocols, and/or any other wireless protocol. The computing entity 106 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 106 components may be located remotely from other computing entity 106 components, such as in a distributed system. Furthermore, one or more of the components may be aggregated and additional components performing functions described herein may be included in the computing entity 106. Thus, the computing entity 106 can be adapted to accommodate a variety of needs and circumstances, such as including various components described with regard to a mobile application executing on the user computing entity 108, including various input/output interfaces.

As depicted in FIG. 1, the system 100 comprises a user computing entity 108. In various embodiments, the user computing entity 108 may be or comprise one or more mobile devices, wearable computing devices, and/or the like. An example user computing entity 108 may include an antenna, a transmitter (e.g., radio), a receiver (e.g., radio), and a processing element that provides signals to and receives signals from the transmitter and receiver, respectively. The signals provided to and received from the transmitter and the receiver, respectively, may include signaling information/data in accordance with an air interface standard of applicable wireless systems to communicate with various devices, such as a computing entity (e.g., central server), another user computing entity 108, and/or the like. In an example embodiment, the transmitter and/or receiver are configured to communicate via one or more SRC protocols. For example, the transmitter and/or receiver may be configured to transmit and/or receive information/data, transmissions, and/or the like of at least one of BLUETOOTH® protocols, low energy BLUETOOTH® protocols, NFC protocols, RFID protocols, IR protocols, WI-FI® protocols, ZIGBEE® protocols, Z-WAVE® protocols, 6LoWPAN protocols, and/or other short range communication protocol. In various embodiments, the antenna, transmitter, and receiver may be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, WI-FI®, WI-FI® Direct, WiMAX, and/or the like. The user computing entity 108 may also include one or more network and/or communications interfaces for communicating with various computing entities, such as by communicating data, content, information, and/or similar terms used herein interchangeably that can be transmitted, received, operated on, processed, displayed, stored, and/or the like. In this regard, the user computing entity 108 may be capable of operating with one or more air interface standards, communication protocols, modulation types, and access types. More particularly, the user computing entity 108 may operate in accordance with any of a number of wireless communication standards and protocols. In a particular embodiment, the user computing entity 108 may operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, WI-FI®, WiMAX, UWB, IR protocols, BLUETOOTH® protocols, USB protocols, and/or any other wireless protocol.

Via these communication standards and protocols, the user computing entity 108 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 108 can also download changes, add-ons, and updates, for instance, to its firmware, software (e.g., including executable instructions, applications, program modules), and operating system.

According to one embodiment, the user computing entity 108 may include location determining aspects, devices, modules, functionalities, and/or similar words used herein interchangeably to acquire location information/data regularly, continuously, or in response to certain triggers.

The user computing entity 108 may also comprise a user interface device comprising one or more user input/output interfaces (e.g., a display and/or speaker/speaker driver coupled to a processing element and a touch interface, keyboard, mouse, and/or microphone coupled to a processing element). For example, the user interface may be configured to provide a mobile application, browser, interactive user interface, dashboard, webpage, and/or similar words used herein interchangeably executing on and/or accessible via the user computing entity 108 to cause display or audible presentation of information/data and for user interaction therewith via one or more user input interfaces. Moreover, the user interface can comprise or be in communication with any of a number of devices allowing the user computing entity 108 to receive information/data, such as a keypad (hard or soft), a touch display, voice/speech or motion interfaces, scanners, readers, or other input device. In embodiments including a keypad, the keypad can include (or cause display of) the conventional numeric (0-9) and related keys (#, *), and other keys used for operating the user computing entity 108 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 108 can capture, collect, store information/data, user interaction/input, and/or the like.

The user computing entity 108 can also include volatile storage or memory and/or non-volatile storage or memory, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 108.

As depicted in FIG. 1, any two or more of the illustrative components of the system 100 of FIG. 1 may be configured to communicate with one another via one or more networks 105. The networks 105 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 105 may have any suitable communication range associated therewith and may include, for example, global networks (e.g., the Internet), MANs, WANs, LANs, or PANs. In addition, the networks 105 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 1 provides an example system 100, it is noted that the scope of the present disclosure is not limited to the example shown in FIG. 1. In some examples, the system 100 may comprise one or more additional and/or alternative elements, and/or may be different from that illustrated in FIG. 1.

Figure 2A:
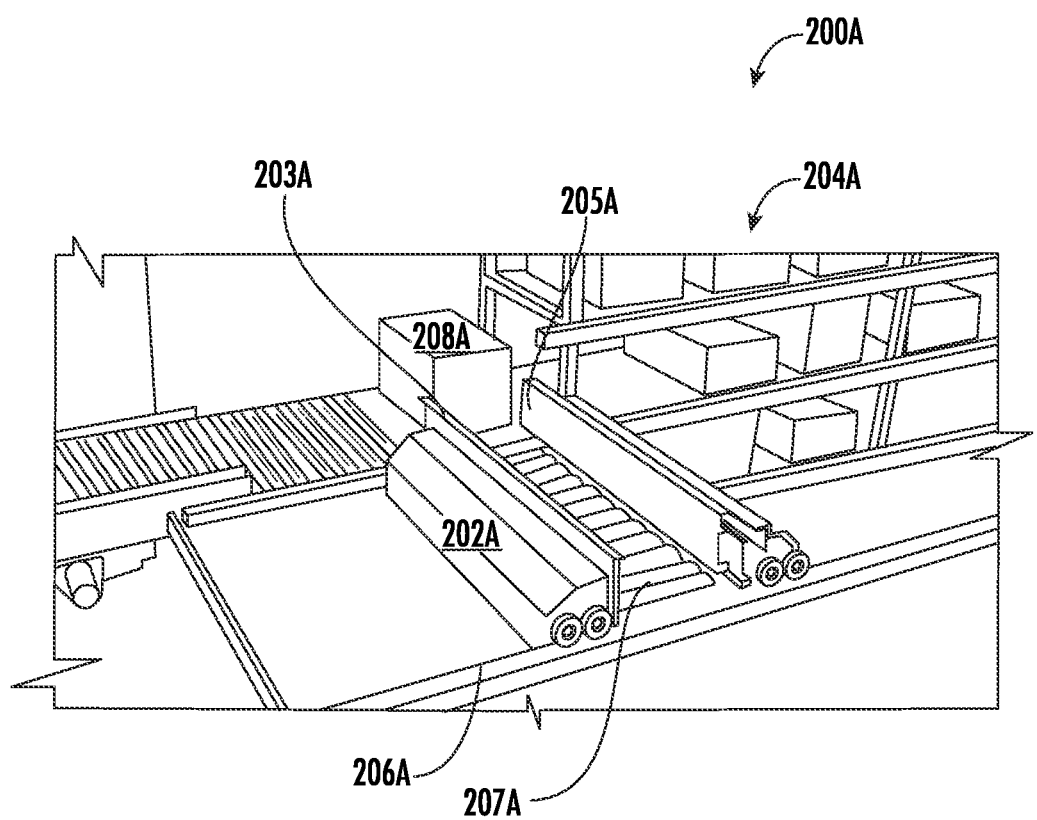
FIG. 2A illustrates an example of a system in accordance with various embodiments of the present disclosure.

Referring now to FIG. 2A, a schematic diagram depicting an example system 200A in accordance with various embodiments of the present disclosure is provided. As depicted, the example system 200A comprises a retrieval apparatus 202A configured to operate in conjunction with at least a portion of a conveyor 206A in order to retrieve and convey a plurality of objects 204A stored on shelves, racks and/or the like. For example, as depicted, the retrieval apparatus 202A is configured to retrieve a first object 208A from a first location of the conveyor 206A. The example system 200A may be an automated or semi-automated warehousing system in which objects may be stored, retrieved, conveyed, and/or the like in response to system instructions and/or user interactions via a computing entity (such as the user computing entity 108 described above in connection with FIG. 1). The system 200A may include one or more shuttles, cranes, lifts, elevators, modules, loading systems, robotic arms, and/or the like.

As noted above, and as depicted in FIG. 2A, the system 200A comprises a retrieval apparatus 202A. The retrieval apparatus 202A, may be or comprise (for example, without limitation) a motorized vehicle, a robot, a shuttle, combinations thereof, and/or the like. The retrieval apparatus 202A may operate in conjunction with various elements, devices, and/or the like of the system 200A to convey objects from one location to another. As illustrated, the retrieval apparatus 202A defines a housing and comprises at least a first arm mechanism 203A, a second arm mechanism 205A and a receiving frame 207A.

As depicted in FIG. 2A, the retrieval apparatus 202A defines a housing/body and may comprise metal, plastic, combinations thereof, and/or the like. As illustrated, the example retrieval apparatus 202A comprises a first arm mechanism 203A disposed adjacent a first side of the retrieval apparatus 202A and a second arm mechanism 205A disposed adjacent a second side of the retrieval apparatus 202A. Additionally, as shown, the retrieval apparatus 202A comprises a receiving frame 207A disposed between the first arm mechanism 203A and the second arm mechanism 205A. As shown, the receiving frame 207A comprises a substantially planar surface configured to receive/support objects thereon. By way of example, in an order fulfilment application, the retrieval apparatus 202A may retrieve objects and place them in a box or package disposed on the receiving frame 207A.

As depicted in FIG. 2A, the first arm mechanism 203A and the second arm mechanism 205A are substantially parallel to one another and are in a retracted position such that they are at least partially disposed within the housing/body of the retrieval apparatus 202A. Additionally, the retrieval apparatus 202A comprises a plurality of motorized wheels disposed on a bottom surface of the retrieval apparatus 202A that operate to convey the retrieval apparatus 202A within the example system 200A (e.g., along at least a portion of a conveyor 206A). In some examples, the motorized wheels, the first arm mechanism 203A and the second arm mechanism 205A may define a unitary body and/or may be operatively coupled to one another to facilitate retrieval operations. In various embodiments, the first arm mechanism 203A and the second arm mechanism 205A are configured to move between a retracted position proximate the housing of the retrieval apparatus 202A to an extended position in order to, for example, retrieve an object 208A (e.g., as depicted, from a location on the conveyor 206A) and place it upon the receiving frame 207A. Subsequent to placing the object 208A on the receiving frame 207A, the retrieval apparatus may transport the object (e.g., via the conveyor belt 206A) to another location. The first arm mechanism 203A and the second arm mechanism 205A may be configured to extend and retract perpendicular to the direction of movement of the retrieval apparatus 202A. By way of example, each of the first arm mechanism 203A and the second arm mechanism 205A may be configured to retract and extend through more than one surface of the retrieval apparatus 202A (e.g., through a first surface and a second surface that is disposed opposite the first surface) or in more than one direction relative to the retrieval apparatus 202A.

Additionally, in various examples, the retrieval apparatus 202A comprises one or more sensing elements and a controller component configured to obtain information/data relating to operations of the retrieval apparatus (e.g., operations of the first arm mechanism 203A and the second arm mechanism 205A) and/or the environment (e.g., locations and/or dimensions of objects). In various examples, the at least one sensing element may be fixedly attached to or coupled to at least one surface of the retrieval apparatus 202A. For example, the at least one sensing element may be attached to any surface of the first arm mechanism 203A or any surface of the second arm mechanism 205A. In various examples, the first arm mechanism 203A and the second arm mechanism 205A each comprise a plurality of sensing elements. The at least one sensing element may operate to obtain data (e.g., image data) relating to the system 200A and its environs and/or the retrieval apparatus 202A.

In various embodiments, the example sensing element may be or comprise one or more of two dimensional (2D) and/or three dimensional (3D) light detection and ranging (LiDAR) sensor(s), long, medium, and/or short range radio detection and ranging (RADAR) sensor(s), (near-) infrared (IR) cameras, 3D cameras, 360° cameras, photoelectric sensor(s), proximity/distance sensor(s), combinations thereof and/or the like that enable the retrieval apparatus 202A to determine and identify one or more objects within its environment and features associated therewith. Additionally, the example sensing apparatus 300 may comprise other components configured to perform various operations, procedures, functions or the like described herein. By way of example, the example sensing element may also be or comprise one or more location sensors, ultrasonic sensors, electromagnetic sensors, accelerometer(s), gyroscope(s) and/or the like. In some embodiments, the example sensing element(s) may be collocated with a processing component of the retrieval apparatus 202A. In some embodiments, one or more of the sensing elements and/or other sensors may be located remotely from the retrieval apparatus 202A. In such examples, one or more sensing elements may be in electronic communication with the retrieval apparatus 202A such that it can exchange data (e.g., receive and transmit data) with the retrieval apparatus 202A. The retrieval apparatus 202A may utilize sensor data and location data collected by the example sensing element(s) to facilitate various retrieval operations.

Figure 2B:
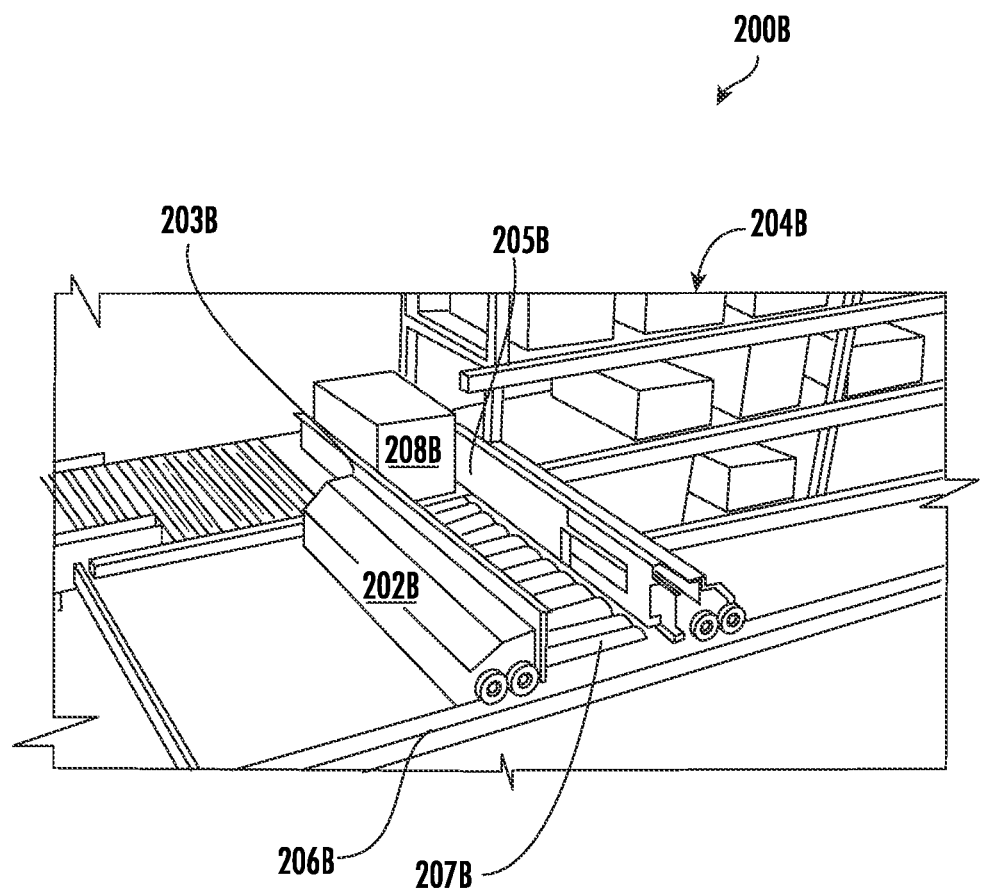
FIG. 2B illustrates an example of a system in accordance with various embodiments of the present disclosure.

Referring now to FIG. 2B, a schematic diagram depicting an example system 200B in accordance with various embodiments of the present disclosure is provided. As depicted, the example system 200B comprises a retrieval apparatus 202B configured to operate in conjunction with at least a portion of a conveyor 206B in order to retrieve and convey a plurality of objects 204B stored on shelves, racks and/or the like. For example, as depicted, the retrieval apparatus 202B is configured to retrieve a first object 208B from a first location of the conveyor 206B.

As illustrated in FIG. 2B, the system 200B comprises a retrieval apparatus 202B. The retrieval apparatus 202B may be or comprise a motorized vehicle, a robot, a shuttle, combinations thereof, and/or the like. The retrieval apparatus 202B may operate in conjunction with various elements, devices, and/or the like of the system 200B to convey objects from one location to another. As illustrated, the retrieval apparatus 202B defines a housing and comprises at least a first arm mechanism 203B, a second arm mechanism 205B and a receiving frame 207B.

As depicted in FIG. 2B, the retrieval apparatus 202B defines a housing/body and may comprise metal, plastic, combinations thereof, and/or the like. As shown, the example retrieval apparatus 202B comprises a first arm mechanism 203B disposed adjacent a first side of the retrieval apparatus 202B and a second arm mechanism 205B disposed adjacent a second side of the retrieval apparatus 202B. Additionally, as depicted, the retrieval apparatus 202B comprises a receiving frame 207B disposed between the first arm mechanism 203B and the second arm mechanism 205B. As depicted, the receiving frame 207A comprises a substantially planar surface configured to receive/support objects thereon.

As depicted in FIG. 2B, the first arm mechanism 203B and the second arm mechanism 205B are substantially parallel to one another and are in an extended position such that they can engage the surface of an object 208B in order to move the object 208B from one location to another (e.g., unto the receiving frame 207B). As depicted, the retrieval apparatus 202B comprises a plurality of motorized wheels disposed on a bottom surface of the retrieval apparatus 202B that operate to convey the retrieval apparatus 202B within the example system 200B (e.g., along at least a portion of a conveyor 206B). In some examples, the motorized wheels, the first arm mechanism 203B and the second arm mechanism 205B may define a unitary body and/or may be operatively coupled to one another to facilitate retrieval operations. Additionally, in various examples, the retrieval apparatus 202B comprises one or more sensing elements and a controller component configured to obtain information/data relating to operations of the retrieval apparatus (e.g., operations of the first arm mechanism 203B and the second arm mechanism 205B) and/or the environment (e.g., locations and/or dimensions of various objects).

While FIG. 2A and FIG. 2B depict example systems 200A and 200B, it is noted that the scope of the present disclosure is not limited to the examples shown in FIG. 2A and FIG. 2B. An example system in accordance with the present disclosure may comprise one or more additional and/or alternative elements, and/or may be different from that illustrated in FIG. 2A and FIG. 2B. For example, a retrieval apparatus in accordance with the present disclosure may not require a conveyor system and may move autonomously in an environment.

Figure 3:
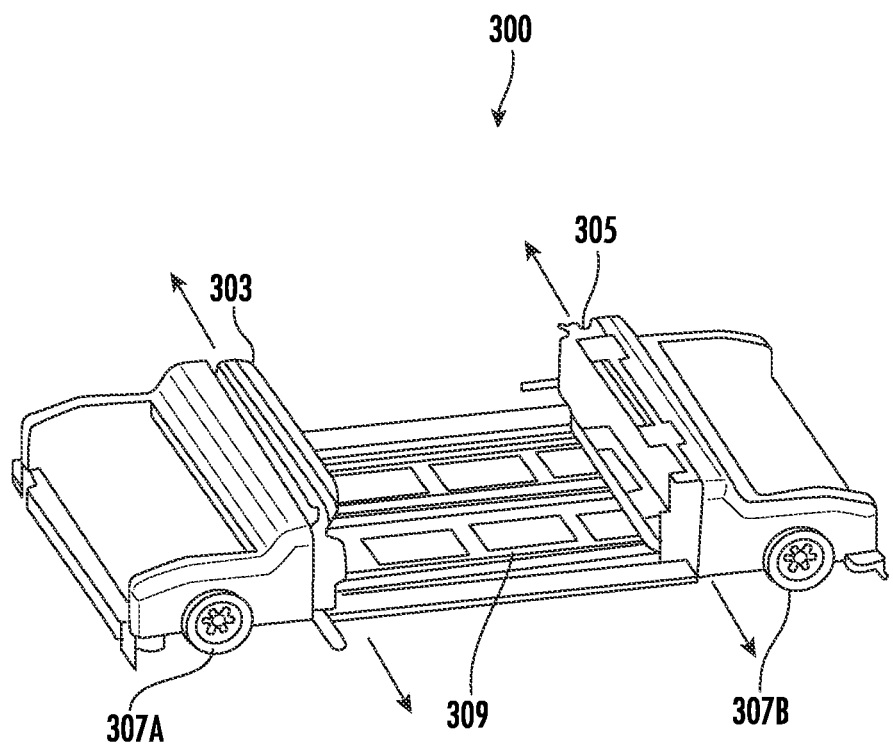
FIG. 3 illustrates an example retrieval apparatus in accordance with various embodiments of the present disclosure.

Referring now to FIG. 3, an example schematic diagram depicting an example perspective view of a retrieval apparatus 300 in accordance various embodiments of the present disclosure is provided. The example retrieval apparatus 300 may operate in conjunction with and/or comprise a portion of a system, such as on a conveyor of an ASRS system.

As depicted in FIG. 3, the retrieval apparatus 300 defines a housing/body and may comprise metal, plastic, combinations thereof, and/or the like. As illustrated, the example retrieval apparatus 300 comprises a first arm mechanism 303 disposed adjacent a first side of the retrieval apparatus 300 and a second arm mechanism 305 disposed adjacent a second side of the retrieval apparatus 300. Additionally, as shown, the retrieval apparatus 300 comprises a receiving frame 309 disposed between the first arm mechanism 303 and the second arm mechanism 305. Additionally, the retrieval apparatus 300 comprises a plurality of motorized wheels (as depicted, at least a first wheel 307A and a second wheel 307B) disposed on a bottom surface of the retrieval apparatus 300 that operate to convey the retrieval apparatus 300 within a system, for example, along a conveyor, tracks and/or the like. In various examples, the retrieval apparatus 300 may be or comprise a plurality of members having different dimensions, shapes and sizes as required for a particular system.

As noted above, and as depicted in FIG. 3, the retrieval apparatus 300 comprises a receiving frame 309. In various examples, as depicted, the receiving frame 309 comprises a substantially planar surface that is configured to house, enclose or otherwise support and receive objects (e.g., articles, items and the like) thereon so as to move the objects from one location to another location within the example system.

As further depicted in FIG. 3, the retrieval apparatus 300 comprises at least a first arm mechanism 303 and a second arm mechanism 305. In various embodiment, and as depicted in FIG. 3, the first arm mechanism 303 and the second arm mechanism 305 are movably attached to at least a surface of the housing of the retrieval apparatus 300. As further depicted, the first arm mechanism 303 and the second arm mechanism 305 are substantially parallel to one another. At least a portion of the first arm mechanism 303 and the second arm mechanism 305 may be configured to be at least partially disposed within the housing of the retrieval apparatus 300 (e.g., when in a retracted position). In various embodiments, the first arm mechanism 303 and the second arm mechanism 305 are configured to move between a retracted position proximate the housing of the retrieval apparatus 300 to an extended position in order to, for example, retrieve an object (e.g., from a storage location) and place it upon the receiving frame 309. Subsequent to placing the object on the receiving frame 309, the retrieval apparatus may transport the object (e.g., via a conveyor) to another location. The first arm mechanism 303 and the second arm mechanism 305 may be configured to extend and retract perpendicular to the direction of movement of the retrieval apparatus 300 as indicated by directional arrows illustrated in FIG. 3. By way of example, each of the first arm mechanism 303 and the second arm mechanism 305 may be configured to retract and extend through more than one surface of the retrieval apparatus 300 (e.g., through a first surface and a second surface that is disposed opposite the first surface).

While FIG. 3 provides an example of various elements of a retrieval apparatus 300, it is noted that the scope of the present disclosure is not limited to the examples shown in FIG. 3. For example, in some embodiments, an example retrieval apparatus 300 may comprise one or more additional and/or alternative elements, and/or may be structured/positioned differently than illustrated in FIG. 3. For instance, although described herein with reference to two arm mechanisms (e.g., first arm mechanism 303 and second arm mechanism 305), the present disclosure contemplates that the two arm mechanism may include any number of members, elements, etc. at any position or orientation based upon the intended application of the retrieval apparatus 300. For example, in instances in which additional articles are simultaneously retrieved by the arm mechanisms, arm mechanisms may similarly extend from the housing of the retrieval apparatus 300. Furthermore, the present disclosure contemplates that the arm mechanisms may be operably connected to one or more motors, rollers, or equivalent mechanisms for causing motion of the arm mechanisms between the retracted and extended positions. Said differently, the retrieval apparatus 300 may include any number of devices, structures, etc. to cause, for example, translation of the arm mechanisms relative to the housing/body of the retrieval apparatus 300.

While FIG. 3 depicts an example retrieval apparatus 300, it is noted that the scope of the present disclosure is not limited to the example shown in FIG. 3. An example retrieval apparatus in accordance with the present disclosure may comprise one or more additional and/or alternative elements, and/or may be different from that illustrated in FIG. 3.

Figure 4:
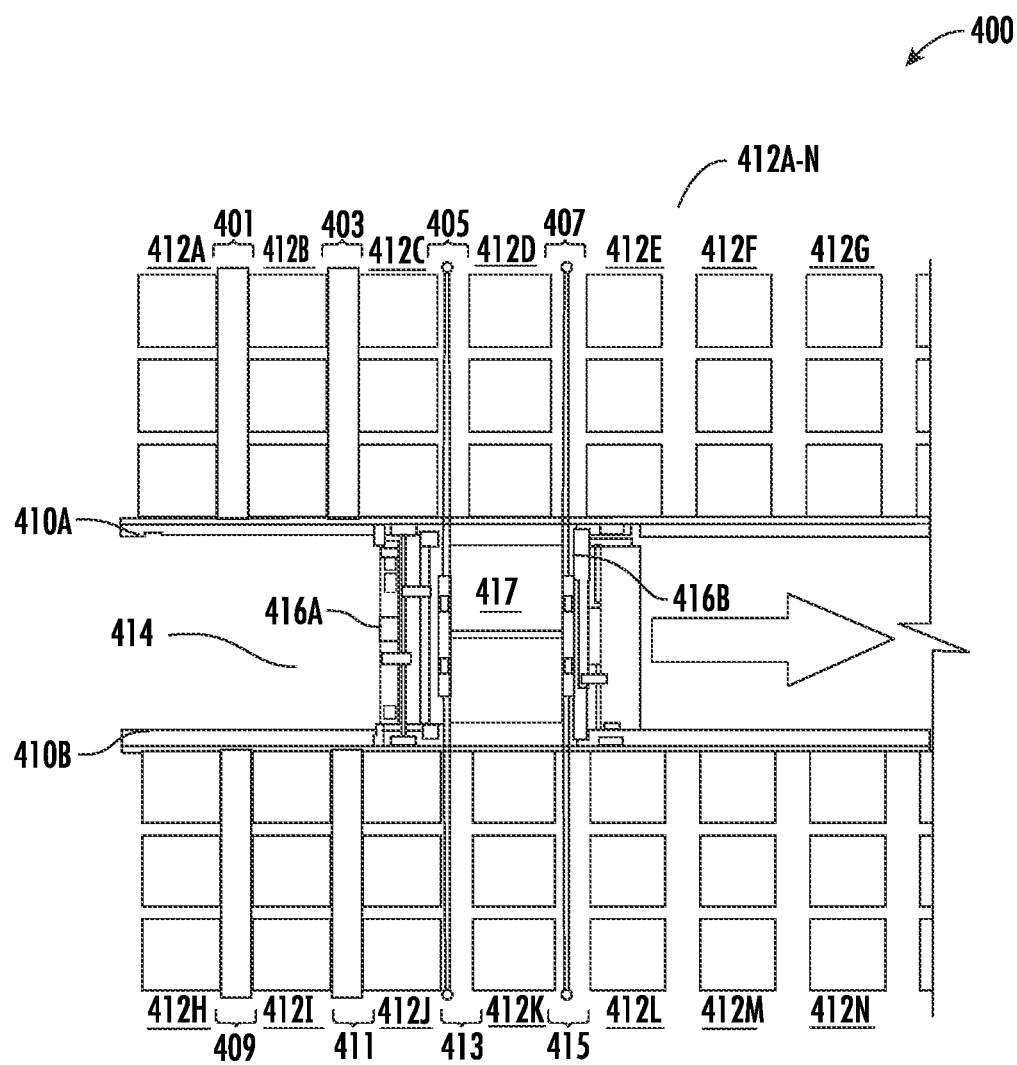
FIG. 4 illustrates an operational example in accordance with various embodiments of the present disclosure.

Referring now to FIG. 4, a schematic diagram depicting an operational example of a system 400 in accordance with various embodiments of the present disclosure.

As depicted in FIG. 4, the example system 400 comprises a plurality of arrays 412A-412N comprising objects disposed in various locations, for example, an array of objects disposed on shelves, racks, and/or the like. As depicted, each array 412A-412N defines a group/set of three objects.

As illustrated, an example retrieval apparatus 414 is configured to traverse at least a portion of a conveyor comprising at least a first track 410A and a second track 410B in order to retrieve and convey objects within the system 400.

As depicted in FIG. 4, the retrieval apparatus 414 defines a housing/body and comprises a first arm mechanism 416A disposed adjacent a first side of the retrieval apparatus 414 and a second arm mechanism 416B disposed adjacent a second side of the retrieval apparatus 414. Additionally, as shown, the retrieval apparatus 414 comprises a receiving frame 417 disposed between the first arm mechanism 416A and the second arm mechanism 416B. Additionally, as depicted the retrieval apparatus 414 comprises a plurality of motorized wheels disposed on a bottom surface of the retrieval apparatus 414 that operate to convey the retrieval apparatus 414 along a first track 410A and a second track 410B.

In various embodiments, and as depicted in FIG. 4, the first arm mechanism 416A and the second arm mechanism 416B are movably attached to at least a surface of the housing of the retrieval apparatus 414 and are substantially parallel to one another. At least a portion of the first arm mechanism 416A and the second arm mechanism 416B may be configured to be at least partially disposed within the housing of the retrieval apparatus 414 (e.g., as depicted, when in a retracted position). In various embodiments, the first arm mechanism 416A and the second arm mechanism 416B are configured to move between a retracted position proximate the housing of the retrieval apparatus 414 to an extended position in order to, for example, retrieve an object (e.g., from a storage location) and place it upon the receiving frame 417. Subsequent to placing the object on the receiving frame 417, the retrieval apparatus may transport the object (e.g., via a conveyor) to another location. The first arm mechanism 416A and the second arm mechanism 416B may be configured to extend and retract perpendicular to the direction of movement of the retrieval apparatus 414 as indicated by directional arrows illustrated in FIG. 4. By way of example, each of the first arm mechanism 416A and the second arm mechanism 416B may be configured to retract and extend through more than one surface of the retrieval apparatus 414 (e.g., through a first surface and a second surface that is disposed opposite the first surface) or in more than one direction relative to the retrieval apparatus 414.

In various examples, the retrieval apparatus 414 comprises at least one sensing element in electronic communication with a controller component of the retrieval apparatus 414 that operates to ensure proper extension and retraction of each of the first arm mechanism 416A and the second arm mechanism 416B. As detailed herein, the at least one sensing element may be or comprise two dimensional (2D) and/or three dimensional (3D) light detection and ranging (LiDAR) sensor(s), long, medium, and/or short range radio detection and ranging (RADAR) sensor(s), (near-) infrared (IR) cameras, 3D cameras, 360° cameras, photoelectric sensor(s), proximity/distance sensor(s), location sensors (e.g., ultrasonic sensors, electromagnetic sensors, accelerometer(s), gyroscope(s) and/or the like), combinations thereof, and/or the like.

In various examples, the at least one sensing element may be fixedly attached to or coupled to at least one surface of the retrieval apparatus 414. For example, the at least one sensing element may be attached to any surface the first arm mechanism 416A or any surface of the second arm mechanism 416B. The at least one sensing element may operate to obtain sensor data (e.g., image data, distance information and/or the like) relating to the system and/or the retrieval apparatus 414 (e.g., the first arm mechanism 416A and the second arm mechanism 416B and/or the environment (e.g., location(s) and/or dimensions of object(s)).

In some examples, as depicted, as the retrieval apparatus 414 traverses the first track 410A and the second track 410B, the at least one sensing element of the retrieval apparatus 414 measures gaps between arrays of objects 412A-412N. For example, as depicted, the at least one sensing element of the retrieval apparatus 414 measures gaps in a first direction perpendicular to the direction of travel of the retrieval apparatus 414. As illustrated, the retrieval apparatus 414 (e.g., via at least one sensing element operatively coupled to the retrieval apparatus 414) measures a first gap 401 between a first array of objects 412A and a second array of objects 412B, a second gap 403 between the second array of objects 412B and a third array of objects 412C, a third gap between the third array of objects 412C and a fourth array of objects 412D, and a fourth gap 407 between the fourth array of objects 412D and a fifth array of objects 412E.

Similarly, as further depicted in FIG. 4, the at least one sensing element of the retrieval apparatus 414 measures gaps between arrays of objects, e.g., as depicted, in a second direction perpendicular to the direction of travel of the retrieval apparatus 414, and opposite to the first direction discussed above. The retrieval apparatus 414 (e.g., via the at least one sensing element operatively coupled to the retrieval apparatus 414) measures a fifth gap 409 between an eighth array of objects 412H and a ninth array of objects 412I, a sixth gap 411 between the ninth array of objects 412I and a tenth array of objects 412J, a seventh gap 413 between the tenth array of objects 412J and an eleventh array of objects 412K, and an eighth gap 415 between the eleventh array of objects 412K and a twelfth array of objects 412L.

While FIG. 4 depicts an operational example of a system 400, it is noted that the scope of the present disclosure is not limited to the example shown in FIG. 4. An example retrieval apparatus in accordance with the present disclosure may comprise one or more additional and/or alternative elements, and/or may be different from that illustrated in FIG. 4.

Figure 5:
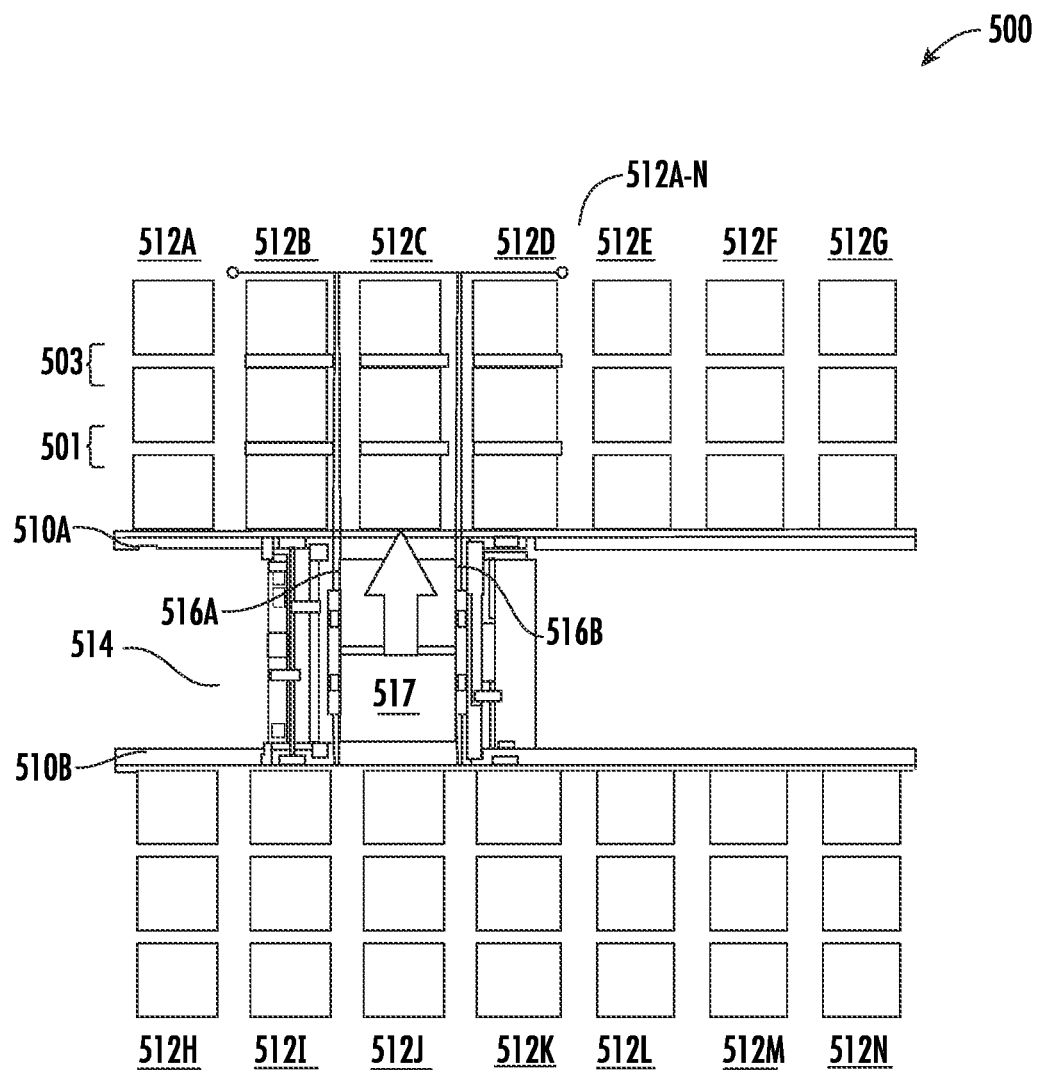
FIG. 5 illustrates another operational example in accordance with various embodiments of the present disclosure.

Referring now to FIG. 5, a schematic diagram depicting an operational example of a system 500 in accordance with various embodiments of the present disclosure.

As depicted in FIG. 5, the example system 500 comprises a plurality of arrays 512A-512N comprising objects disposed in various locations, for example, an array of objects disposed on shelves, racks, and/or the like. As depicted, each array 512A-512N defines a group/set of three objects.

As further depicted, an example retrieval apparatus 514 is configured to traverse at least a portion of a conveyor comprising at least a first track 510A and a second track 510B in order to retrieve and convey objects within the system 500.

As depicted in FIG. 5, the retrieval apparatus 514 defines a housing/body and comprises a first arm mechanism 516A disposed adjacent a first side of the retrieval apparatus 514 and a second arm mechanism 516B disposed adjacent a second side of the retrieval apparatus 514. Additionally, as shown, the retrieval apparatus 514 comprises a receiving frame 517 disposed between the first arm mechanism 516A and the second arm mechanism 516B. The retrieval apparatus 514 comprises a plurality of motorized wheels disposed on a bottom surface of the retrieval apparatus 514 that operate to convey the retrieval apparatus 514 along a first track 510A and a second track 510B.

In various embodiments, and as depicted in FIG. 5, the first arm mechanism 516A and the second arm mechanism 516B are movably attached to at least a surface of the housing of the retrieval apparatus 514 and are substantially parallel to one another. At least a portion of the first arm mechanism 516A and the second arm mechanism 516B may be configured to be at least partially disposed within the housing of the retrieval apparatus 514 (e.g., when in a retracted position). During operations, the retrieval apparatus 514 may, for example, extend the first arm mechanism 516A and the second arm mechanism 516B from a retracted position to a particular location in space (e.g., to a first location proximate an object) so as to, as described herein, retrieve an example object.

As shown, the first arm mechanism 516A and the second arm mechanism 516B are in an extended position. As depicted, at least a portion of the first arm mechanism 516A is disposed between a second array of objects 512B and a third array of objects 512C and at least a portion of the second arm mechanism 516B is disposed between the third array of objects 512C and a fourth array of objects 512D. In various embodiments, the first arm mechanism 516A and the second arm mechanism 516B are configured to move between a retracted position proximate the housing of the retrieval apparatus 514 to an extended position in order to, for example, retrieve an object (e.g., from a storage location) and place it upon the receiving frame 517. Subsequent to placing the object on the receiving frame 517, the retrieval apparatus may transport the object (e.g., using the first track 510A and the second track 510B) to another location. As depicted, the first arm mechanism 516A and the second arm mechanism 516B are configured to extend and retract perpendicular to the direction of movement of the retrieval apparatus 514.

In various examples, the retrieval apparatus 514 comprises at least one sensing element in electronic communication with a controller component of the retrieval apparatus 514 that operates to ensure proper extension and retraction of each of the first arm mechanism 516A and the second arm mechanism 516B. In various examples, the at least one sensing element may be fixedly attached to or coupled to at least one surface (e.g., the body or housing) of the retrieval apparatus 514. In some examples, the at least one sensing element may be attached to the first arm mechanism 516A or the second arm mechanism 516B. The at least one sensing element may operate to obtain data (e.g., image data, distance information and/or the like) relating to the system and/or the retrieval apparatus 514 (e.g., the first arm mechanism 516A and the second arm mechanism 516B and/or the environment (e.g., location(s) and/or dimensions of object (s)).

In some examples, as depicted, as the retrieval apparatus 514 traverses the first track 510A and the second track 510B, the at least one sensing element of the retrieval apparatus 514 measures gaps between arrays of objects 512A-512N in a second direction parallel to the direction of travel of the retrieval apparatus 514. For example, when the first arm mechanism 516A and the second arm mechanism 516B are in an extended position, at least one sensing element attached thereto may measure gaps between arrays of objects 512A-512N.

As illustrated, the retrieval apparatus 514 (e.g., via at least one sensing element operatively coupled to the retrieval apparatus 514) measures a first gap 501 between objects of one or more arrays (as depicted, the second array of objects 512B, the third array of objects 512C and the fourth array of objects 512D). As further depicted, the retrieval apparatus 514 measures a second gap 503 between objects of one or more arrays (as depicted, the second array of objects 512B, the third array of objects 512C and the fourth array of objects 512D).

While FIG. 5 depicts an operational example of a system 500, it is noted that the scope of the present disclosure is not limited to the example shown in FIG. 5. An example system 500 in accordance with the present disclosure may comprise one or more additional and/or alternative elements, and/or may be different from that illustrated in FIG. 5.

Figure 6:
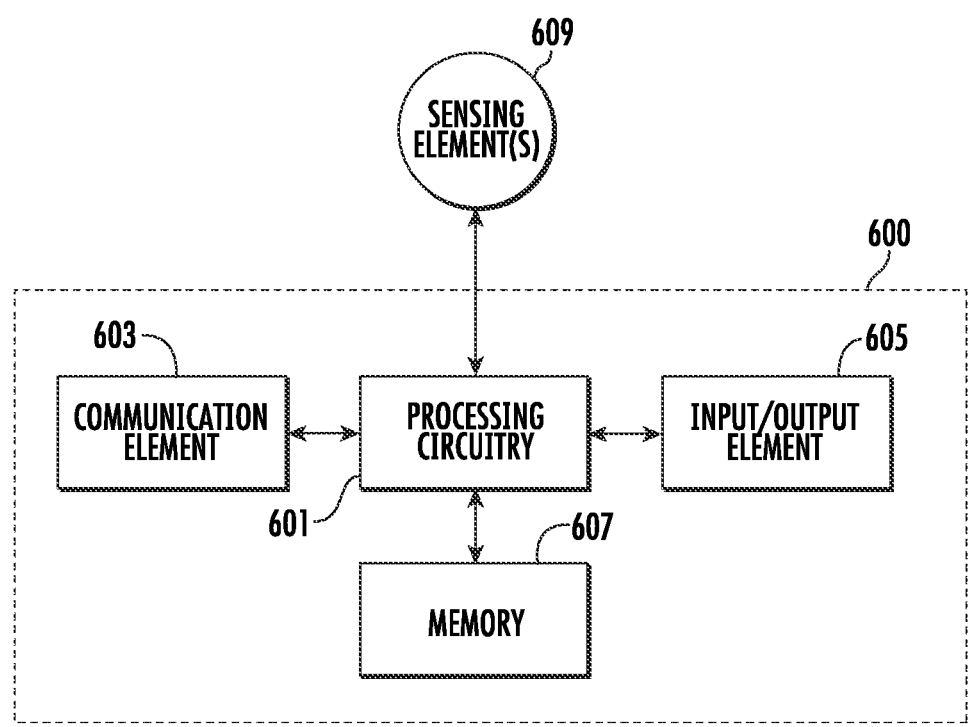
FIG. 6 illustrates an example processor component in electronic communication with various other components of an example apparatus in accordance with various embodiments of the present disclosure.

Referring now to FIG. 6, a schematic diagram depicting an example processing component 600 of an example retrieval apparatus in electronic communication with one or more sensing elements 609 in accordance with various embodiments of the present disclosure is provided. As shown, the processing component 600 comprises processing circuitry 601, a communication element 603, input/output element 605, a memory 607 and/or other components configured to perform various operations, procedures, functions or the like described herein.

The processing circuitry 601 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 6 as a single processor, in an embodiment, the processing circuitry 601 may include a plurality of processors and signal processing modules. The plurality of processors may be embodied on a single electronic device or may be distributed across a plurality of electronic devices collectively configured to function as the circuitry of the retrieval apparatus. The plurality of processors may be in operative communication with each other and may be collectively configured to perform one or more functionalities of the circuitry of the retrieval apparatus as described herein. In an example embodiment, the processing circuitry 601 may be configured to execute instructions stored in the memory 607 or otherwise accessible to the processing circuitry 601. These instructions, when executed by the processing circuitry 601, may cause the circuitry of the retrieval apparatus to perform one or more of the functionalities, as described herein.

Whether configured by hardware, firmware/software methods, or by a combination thereof, the processing circuitry 601 may include an entity capable of performing operations according to embodiments of the present disclosure while configured accordingly. Thus, for example, when the processing circuitry 601 is embodied as an ASIC, FPGA or the like, the processing circuitry 601 may include specifically configured hardware for conducting one or more operations described herein. Additionally, or alternatively, when the processing circuitry 601 is embodied as an executor of instructions, such as may be stored in the memory 607, the instructions may specifically configure the processing circuitry 601 to perform one or more algorithms and operations described herein.

Thus, the processing circuitry 601 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a combination thereof. The memory can also be located internal to another computing resource (e.g., enabling computer readable instructions to be downloaded over the Internet or another wired or wireless connection).

The memory 607 may include suitable logic, circuitry, and/or interfaces that are adapted to store a set of instructions that is executable by the processing circuitry 601 to perform predetermined operations. Additionally or alternately, the memory 607 may be configured to store data/information, application programs, instructions, and etc., so that the processing component 600 can execute various functions according to the embodiments of the present disclosure. For example, in at least some embodiments, the memory 607 is configured to cache input data for processing by the processing circuitry 601. Thus, in at least some embodiments, the memory 607 is configured to store program instructions for execution by the processing circuitry 601. The memory 607 may store information in the form of static and/or dynamic information. When the functions are executed, the stored information may be stored and/or used by the processing component 600. Example memory implementations may include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 607 may be integrated with the processing circuitry 601 on a single chip, without departing from the scope of the disclosure.

The communication element 603 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 607) and executed by a processing component 600 (for example, the processing circuitry 601). In some embodiments, the communication element 603 (as with other components discussed herein) may be at least partially implemented as the processing circuitry 601 or otherwise controlled by the processing circuitry 601. In this regard, the communication element 603 may communicate with the processing circuitry 601, for example, through a bus. The communication element 603 may comprise, for example, antennas, transmitters, receivers, transceivers, network interface cards and/or supporting hardware and/or firmware/software, and is used for establishing communication with another apparatus. The communication element 603 may be configured to receive and/or transmit any data that may be stored by the memory 607 by using any protocol that can be used for communication between apparatuses. The communication element 603 may additionally or alternatively communicate with the memory 607, the input/output element 605 and/or any other component of the processing component 600, for example, through a bus.

In some embodiments, the processing component 600 may comprise an input/output element 605. The input/output element 605 may communicate with the processing circuitry 601 to receive instructions input by the user and/or to provide audible, visual, mechanical or other outputs to the user. Therefore, the input/output element 605 may comprise supporting devices, such as a keyboard, a mouse, a display, a touch screen display, and/or other input/output mechanisms. Alternatively, at least some aspects of the input/output element 605 may be implemented on a device used by the user to communicate with the processing component 600. The input/output element 605 may communicate with the memory 607, the communication element 603 and/or any other component, for example, through a bus. One or a plurality of input/output modules and/or other components may be included in the processing component 600.

Figure 7:
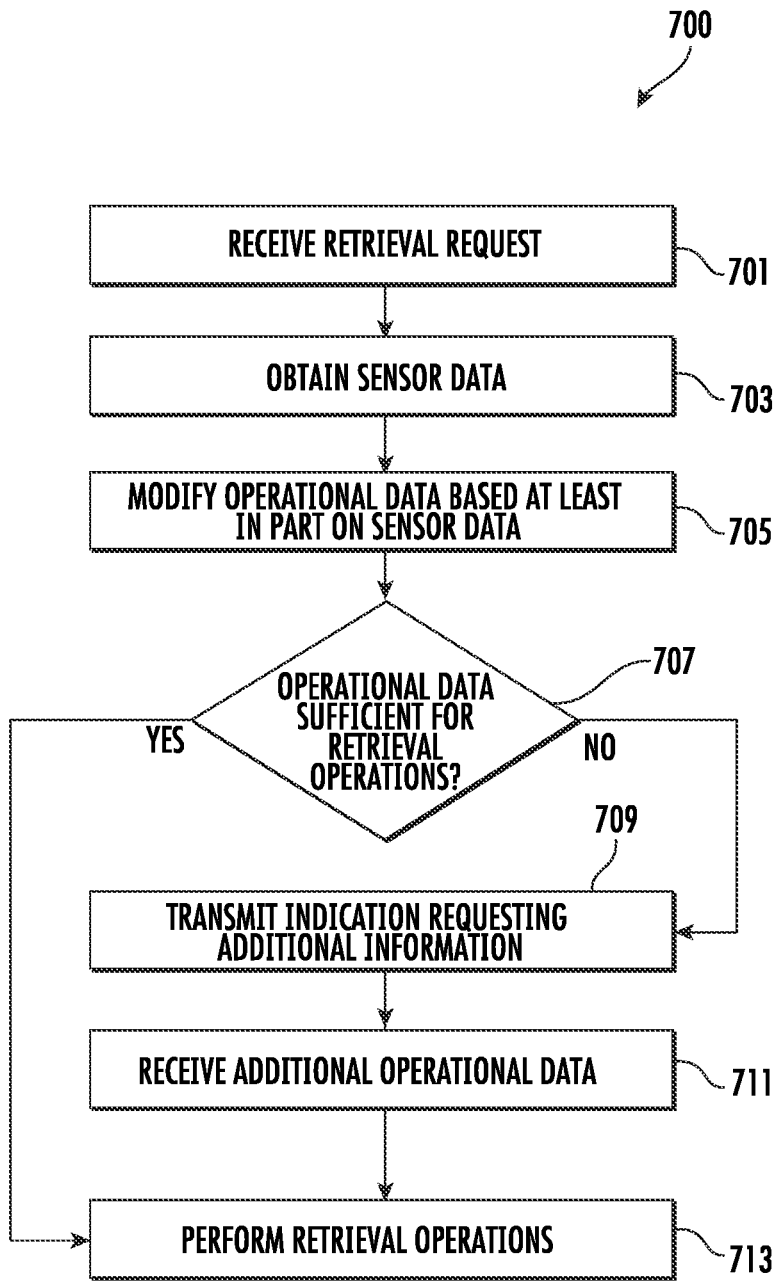
FIG. 7 is a flowchart diagram illustrating example operations in accordance with various embodiments of the present disclosure.

Referring now to FIG. 7, a flowchart diagram illustrating example operations 700 in accordance with various embodiments of the present disclosure is provided. In some examples, the method 700 may be performed by various system components (for example, but not limited to, processing circuitry 601 of the retrieval apparatus described above with regard to FIG. 6). In some examples, the processing circuitry may be electrically coupled to and/or in electronic communication with other circuitries, such as, but not limited to, one or more computing entities (such as, but not limited to, computing entity 106 described above in connection with FIG. 1) a memory (such as, for example, random access memory (RAM) for storing computer program instructions), and/or the like.

The example method 700 begins at step/operation 701. At step/operation 701, processing circuitry (such as, but not limited to, the processing circuitry 601 of the retrieval apparatus illustrated with regard to FIG. 6, discussed above) receives a retrieval request. In some examples, the retrieval apparatus may receive a control indication/signal comprising the retrieval request from a computing entity (such as, but not limited to, the computing entity 106 described above in connection with FIG. 1). In various embodiments, the retrieval apparatus may be a shuttle, robot, motorized vehicle, combinations thereof, and/or the like.

Subsequent to step/operation 701, the example method 700 proceeds to step/operation 703. At step/operation 703, processing circuitry obtains sensor data (e.g., via at least one sensing element, such as, but not limited to, sensing element 609 described above in connection with FIG. 6). By way of example, processing circuitry obtains sensor data describing locations and characteristics (e.g., length, width, height, cross-sectional area, shape, weight and/or the like) of at least some of a plurality of objects in an environment as the retrieval apparatus traverses the environment. In some examples, the sensor data describes at least a first gap between at least two of the plurality of objects in a first direction (e.g., in a direction perpendicular to a direction of travel of the retrieval apparatus), and at least a second gap between the at least two of the plurality of objects in a second direction that is parallel to the first direction (e.g., in a direction parallel to the direction of travel of the retrieval apparatus).

For example, the processing component may be configured to process the sensor data, such as by computer-executable instructions, that indicate which data is to be used in the analysis, provide one or more algorithms or functions for performing the analysis, provide one or more coefficients and/or parameters to be used in accordance with an algorithm for performing the analysis, perform one or more guidelines for providing a response indicating a result in the analysis, and/or the like. In example embodiments, the computer executable instructions may be configured in accordance with a standardized computer programming language. In an example embodiment, the computer-executable instructions may comprise a reference to a function repository and/or one or more coefficients and/or parameters to be used in the calculation and or determination of the result of the referenced instructions, function or algorithm. In some embodiments, at least a portion of the analysis may be performed by another computing entity (such as, for example, without limitation, the one or more computing entities 106 described above with regard to FIG. 1). In such examples, the computing entity may perform at least a portion of the analysis and provide (e.g., transmit or send) the results of the analysis to the processing component of the retrieval apparatus. In some examples, the processing component and/or computing entity may analyze sensor data pursuant to an image segmentation and/or object pose estimation techniques. For example, a computer vision algorithm(s) (e.g., convolutional neural network (CNN), computer vision segmentation algorithms such as region-based segmentation, edge detection or clustering techniques) may be utilized by the processing component and/or other computing entity to determine locations and characteristics of one or more objects captured in example image data. In some examples, identifying object characteristics may comprise identifying a respective label, stock-keeping unit, barcode, packaging and/or the like corresponding with a respective item. The processing component and/or other computing entity may segment objects/items in image data in order to identify distinct elements/items and characteristics associated therewith. The machine learning model may be trained using a training set of manually analyzed images.

Subsequent to step/operation 703, the example method 700 proceeds to step/operation 705. At step/operation 705, processing circuitry modifies operational data based at least in part on the sensor data. As noted above, operational data may comprise object information and/or location or mapping information, including data indicative of object characteristics (e.g., length, width, height, cross-sectional area, shape, weight and/or the like). Accordingly, modifying the operational data may comprise auditing operational data (e.g., by comparing operational data and sensor data) to confirm accuracy of the operational data that may, in some examples, be stored in memory. By way of example, if the processing circuitry determines that stored operational data is associated with a timestamp that is prior to a timestamp associated with sensor data, the processing circuitry may update the stored operational data based at least in part on the sensor data.

Subsequent to step/operation 705, the example method 700 proceeds to step/operation 707. At step/operation 707, processing circuitry determines whether the operational data is sufficient for facilitating retrieval operations. In some cases, the processing circuitry may determine that stored and/or received operational data (e.g., operational data received with a retrieval request) and/or sensor data for a particular location is associated with a time period (e.g., timestamp) that is prior to a pre-determined threshold time period (e.g., two hours) and/or that there is no available sensor data associated with the location. By way of example, processing circuitry may determine that the stored and/or received operational data for an array of objects is three hours before the present time. Additionally, the operational data threshold time period may be two hours. Accordingly, processing circuitry may determine that the current operational data is insufficient for retrieval operations. In another example, the processing circuitry may determined that stored and/or received operational data for an array of objects is one hour before the present time. In the above example, where the operational data threshold time period is two hours, processing circuitry may determine that the current operational data is sufficient for retrieval operations and proceed to step/operation 711.

Subsequent to step/operation 707, and in an instance in which the processing circuitry determines that the operational data is insufficient for retrieval operations (e.g., such as by failing to satisfy an operational data threshold time period, the example method 700 proceeds to step/operation 709. At step/operation 709, processing circuitry transmits an indication requesting additional operational data. In various examples, the indication requesting additional operational data may be transmitted to a computing entity (e.g., central server) in electronic communication with the retrieval apparatus. In some examples, requesting additional operational data comprises causing the computing entity to obtain operational data via one or more remote sensing components and/or other retrieval apparatuses in electronic communication therewith (e.g., via stationary image sensors/cameras or the other retrieval apparatuses within the environment). By way of example, the computing entity may cause another retrieval apparatus within a threshold distance/vicinity of a target location to capture sensor data (e.g., images) via one or more sensing elements.

Subsequent to step/operation 709, the method 700 proceeds to step/operation 711. At step/operation 711, processing circuitry receives the additional operational data (e.g., sensor data, stored operational data associated with a particular period of time (e.g., as indicated by timestamp data), combinations thereof, and/or the like). In various examples, processing circuitry may update and/or modify stored operational data based at least in part on the received additional operational data.

Subsequent to step/operation 711, the method 700 proceeds to step/operation 713. At step/operation 711, processing circuitry performs the retrieval operations based at least in part on the additional operational data or the operational data deemed sufficient for retrieval operations at step/operation 707. Performing retrieval operations may comprise causing at least one arm mechanism to engage a surface of at least one of the plurality of objects based at least in part on the modified/updated operational data. By way of example, processing circuitry may cause the at least one arm mechanism to retrieve an object from a particular location (e.g., from a rack, shelf, and/or the like) and place the object in a box that is disposed on a retrieving frame.

Figure 8:
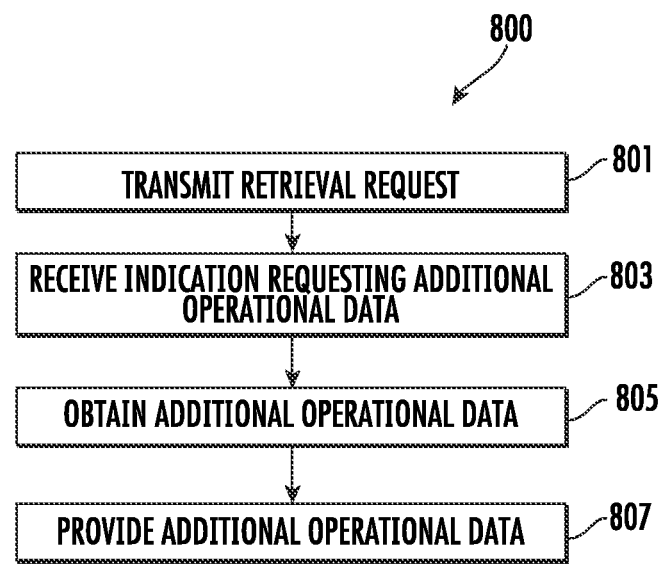
FIG. 8 is a flowchart diagram illustrating example operations in accordance with various embodiments of the present disclosure.

Referring now to FIG. 8, a flowchart diagram illustrating example operations 800 in accordance with various embodiments of the present disclosure is provided. In some examples, the method 800 may be performed by various system components (for example, but not limited to, processing circuitry of a computing entity 106 described above with regard to FIG. 1). The computing entity 106 may be or comprise a central server. In some examples, the processing circuitry may be electrically coupled to and/or in electronic communication with other circuitries, such as, but not limited to, one or more retrieval apparatuses (such as, for example, retrieval apparatus 300 described above in connection with FIG. 3).

The example method 800 begins at step/operation 801. At step/operation 801, processing circuitry (such as, but not limited to, the processing circuitry of the computing entity 106 described above in connection with FIG. 1) transmits a retrieval request to a retrieval apparatus. In some examples, transmitting a retrieval request may comprise establishing a connection with a retrieval apparatus such that the retrieval apparatus and the processing circuitry (e.g., computing entity) can exchange data/information with one another. In some examples, the retrieval request may comprise operational data (e.g., object information and/or location or mapping information, including data indicative of object characteristics).

Subsequent to step/operation 801, the method proceeds to step/operation 803. At step/operation 803, the processing circuitry receives an indication (e.g., from an example retrieval apparatus) requesting additional operational data (e.g., in an instance in which the retrieval apparatus determines that operational data is insufficient for retrieval operations as discussed above). The indication may comprise location information identifying an area for which additional operational data is required to facilitate retrieval operations.

Subsequent to step/operation 803, the method proceeds to step/operation 805. At step/operation 803, the processing circuitry obtains additional operational data. In some examples, obtaining additional operational data comprises causing one or more sensors (e.g., stationary image sensors/cameras) and/or other retrieval apparatuses to capture and/or provide sensor data (e.g., image data) from a location (e.g., a location identified/provided by the retrieval apparatus).

Subsequent to step/operation 805, the method proceeds to step/operation 807. At step/operation 807, the processing circuitry provides the additional operational data, for example to the retrieval apparatus that provided the indication requesting the additional operational data (e.g., associated with one or more particular arrays of objects within a system).

Using the methods and techniques described above, retrieval apparatuses may perform retrieval operations dynamically and autonomously thereby improving system throughput, speed and accuracy in a variety of applications.

In some examples, one or more of the procedures described in FIG. 7 and FIG. 8 may be embodied by computer program instructions, which may be stored by a memory (such as a non-transitory memory) of a system employing an embodiment of the present disclosure and executed by a processing component/circuitry of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information. In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A retrieval apparatus comprising:
   at least one moveable arm configured to engage a surface of at least one of a plurality of objects disposed on shelves;
   at least one sensor configured to obtain sensor data describing locations and characteristics of at least some of the plurality of objects as the retrieval apparatus traverses an environment associated with the plurality of objects disposed on the shelves;
   a memory that stores computer-executable instructions; and
   at least one processor in electronic communication with the at least one moveable arm and the at least one sensor, wherein the at least one processor is configured to execute the computer-executable instructions to:
      determine that stored operational data is insufficient for retrieval operations when the stored operational data is associated with a timestamp that is prior to at least one of a time stamp associated with the sensor data and a threshold time period, and
      modify the stored operational data based at least in part on the sensor data, wherein the stored operational data comprises object location information and object characteristics associated with the plurality of objects disposed on the shelves.

2. The retrieval apparatus of claim 1, wherein the at least one processor is configured to, in response to receiving a retrieval request, cause the at least one moveable arm to engage the surface of at least one of the plurality of objects based at least in part on the modified operational data.

3. The retrieval apparatus of claim 2, wherein the retrieval apparatus comprises a receiving frame, and wherein the at least one moveable arm is configured to retrieve at least one of the plurality of objects and place it on the receiving frame.

4. The retrieval apparatus of claim 1, wherein the sensor data describes at least a first gap between at least two of the plurality of objects in a first direction, and at least a second gap between the at least two of the plurality of objects in a second direction that is parallel to the first direction.

5. The retrieval apparatus of claim 1, wherein the at least one sensor comprises one or more light detection and ranging (LiDAR) sensors, radio detection and ranging (RADAR) sensors, infrared (IR) cameras, 3D cameras, 360° cameras, photoelectric sensors or proximity sensors.

6. The retrieval apparatus of claim 1, wherein the at least one sensor is attached to at least a surface of the at least one moveable arm.

7. The retrieval apparatus of claim 1, wherein the at least one sensor comprises at least one location sensor.

8. The retrieval apparatus of claim 2, wherein the retrieval request comprises the stored operational data, and wherein the retrieval request is provided by a computing entity in electronic communication with the retrieval apparatus.

9. The retrieval apparatus of claim 1, wherein the at least one processor is further configured to determine whether the stored operational data is sufficient for facilitating the retrieval operations, and transmit an indication requesting additional operational data in an instance in which the stored operational data is deemed insufficient for facilitating the retrieval operations.

10. The retrieval apparatus of claim 1, wherein the at least one processor is configured to transmit at least a portion of the sensor data to a computing entity.

11. A method for dynamically retrieving a plurality of objects by a retrieval apparatus, the retrieval apparatus comprising at least one moveable arm, at least one sensor, a memory having computer-executable instructions, and at least one processor configured to execute the computer-executable instructions to control operations for dynamically retrieving the plurality of objects by the retrieval apparatus, the method comprising:
   obtaining, by the at least one sensor, sensor data associated with at least some of the plurality of objects as the retrieval apparatus traverses an environment associated with the plurality of objects disposed on shelves;
   determining that stored operational data is insufficient for retrieval operations when the stored operational data is associated with a timestamp that is prior to at least one of a time stamp associated with the sensor data and a threshold time period;
   modifying, by the at least one processor, the stored operational data based at least in part on the sensor data, wherein the stored operational data comprises object location information and object characteristics associated with the plurality of objects disposed on the shelves; and
   in response to receiving a retrieval request, causing, by the at least one processor, the at least one moveable arm to engage a surface of the at least one of the plurality of objects disposed on the shelves based at least in part on the modified operational data.

12. The method of claim 11, wherein the sensor data describes at least a first gap between at least two of the plurality of objects in a first direction, and at least a second gap between the at least two of the plurality of objects in a second direction that is parallel to the first direction.

13. The method of claim 11, wherein the at least one sensor comprises one or more light detection and ranging (LiDAR) sensors, radio detection and ranging (RADAR)

sensors, infrared (IR) cameras, 3D cameras, 360° cameras, photoelectric sensors or proximity sensors.

14. The method of claim 11, wherein the at least one sensor is attached to at least a surface of the at least one moveable arm.

15. The method of claim 11, wherein the at least one sensor comprises at least one location sensor.

16. The method of claim 11, wherein the retrieval request comprises the stored operational data, and wherein the retrieval request is provided by a computing entity in electronic communication with the retrieval apparatus.

17. The method of claim 11, further comprising:
  determining, by the at least one processor, whether the stored operational data is sufficient for facilitating the retrieval operations; and
  transmitting, by the at least one processor, an indication requesting additional operational data in an instance in which the stored operational data is deemed insufficient for facilitating the retrieval operations.

18. The method of claim 11, further comprising:
  transmitting, by the at least one processor, at least a portion of the sensor data to a computing entity.

* * * * *